(12) United States Patent
Okado

(10) Patent No.: US 8,339,482 B2
(45) Date of Patent: Dec. 25, 2012

(54) IMAGE CAPTURING APPARATUS WITH CORRECTION USING OPTICAL BLACK AREAS, CONTROL METHOD THEREFOR AND PROGRAM

(75) Inventor: Teruyuki Okado, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 284 days.

(21) Appl. No.: 12/692,121

(22) Filed: Jan. 22, 2010

(65) Prior Publication Data

US 2010/0194935 A1  Aug. 5, 2010

(30) Foreign Application Priority Data

Feb. 3, 2009  (JP) ................................. 2009-022960

(51) Int. Cl.
*H04N 9/64* (2006.01)
(52) U.S. Cl. ......... 348/248; 348/241; 348/243; 348/245
(58) Field of Classification Search .......... 348/241–251, 348/345
See application file for complete search history.

(56) References Cited

U.S. PATENT DOCUMENTS

| | | | | |
|---|---|---|---|---|
| 4,581,651 A * | 4/1986 | Miyata et al. | ................. | 348/249 |
| 6,809,763 B1 * | 10/2004 | Yoshida | ........................ | 348/248 |
| 6,970,193 B1 * | 11/2005 | Kidono et al. | ................ | 348/245 |
| 7,218,351 B2 * | 5/2007 | Miyahara et al. | ............. | 348/313 |
| 7,277,128 B2 * | 10/2007 | Miyahara | ...................... | 348/249 |
| 7,545,420 B2 * | 6/2009 | Kondo | .......................... | 348/248 |
| 7,710,473 B2 * | 5/2010 | Sato | ............................... | 348/249 |
| 7,812,801 B2 * | 10/2010 | Takane | ............................. | 345/87 |
| 2003/0103063 A1 * | 6/2003 | Mojaver et al. | ................ | 345/647 |
| 2003/0160772 A1 * | 8/2003 | Kunimi et al. | ................ | 345/204 |
| 2004/0169896 A1 * | 9/2004 | Kondo | .......................... | 358/482 |
| 2006/0114342 A1 * | 6/2006 | Egawa | .......................... | 348/241 |
| 2006/0274173 A1 * | 12/2006 | Yoshida et al. | ............... | 348/294 |
| 2007/0165120 A1 * | 7/2007 | Takane | ........................... | 348/248 |
| 2008/0239110 A1 * | 10/2008 | Hara | .............................. | 348/241 |
| 2008/0273101 A1 * | 11/2008 | Takenaka et al. | ............ | 348/243 |
| 2009/0086051 A1 * | 4/2009 | Hagiwara | .................. | 348/222.1 |
| 2011/0032394 A1 * | 2/2011 | Peng et al. | .................... | 348/248 |

FOREIGN PATENT DOCUMENTS

| | | |
|---|---|---|
| JP | 07-067038 | 3/1995 |
| JP | 2001-024943 | 1/2001 |

* cited by examiner

*Primary Examiner* — John Villecco
*Assistant Examiner* — Selam Gebriel
(74) *Attorney, Agent, or Firm* — Cowan, Liebowitz & Latman, P.C.

(57) ABSTRACT

An image capturing apparatus comprises: an image sensor having an effective pixel area where plural pixels not shield from light are two-dimensionally arranged, and a first optical black area and a second optical black area including pixels shielded from light provided on the both sides of the effective pixel area; and a correction unit to, upon incident of high luminance light on the image sensor, correct an output signal of a pixel between a high luminance portion as a pixel part on which the high luminance light is incident in the effective pixel area and the first optical black area using an output signal of the first optical black area, and correct an output signal of a pixel between the high luminance portion and the second optical black area, using an output signal of the second optical black area.

5 Claims, 10 Drawing Sheets

FIG. 6A
|  | 0 | 1 | 2 | 3 | 4 | 5 | 6 | 7 | 8 | 9 | → X ADDRESS |
|---|---|---|---|---|---|---|---|---|---|---|---|
| IDEAL IMAGE 0 | 10 | 10 | 10 | 10 | 10 | 10 | 10 | 10 | 10 | 10 | |
| 1 | 10 | 10 | 10 | 10 | 10 | 10 | 10 | 10 | 10 | 10 | |
| 2 | 10 | 10 | 10 | 10 | 99 | 99 | 10 | 10 | 10 | 10 | |
| 3 | 10 | 10 | 10 | 10 | 99 | 99 | 10 | 10 | 10 | 10 | |
| 4 | 10 | 10 | 10 | 10 | 99 | 99 | 10 | 10 | 10 | 10 | |
| 5 | 10 | 10 | 10 | 10 | 10 | 10 | 10 | 10 | 10 | 10 | |
↓ Y ADDRESS
FIG. 6B
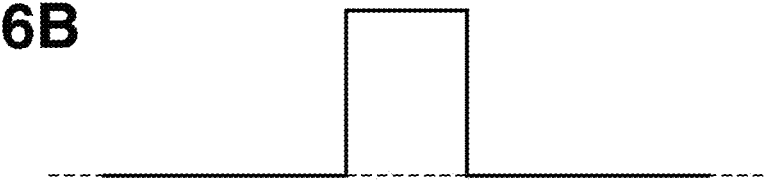
FIG. 7A
|  | 0 | 1 | 2 | 3 | 4 | 5 | 6 | 7 | 8 | 9 | → X ADDRESS |
|---|---|---|---|---|---|---|---|---|---|---|---|
| 0 | 10 | 10 | 10 | 10 | 10 | 10 | 10 | 10 | 10 | 10 | |
| 1 | 10 | 10 | 10 | 10 | 10 | 10 | 10 | 10 | 10 | 10 | |
| 2 | 8 | 8 | 8 | 8 | 99 | 99 | 12 | 12 | 12 | 12 | |
| 3 | 8 | 8 | 8 | 8 | 99 | 99 | 12 | 12 | 12 | 12 | |
| 4 | 8 | 8 | 8 | 8 | 99 | 99 | 12 | 12 | 12 | 12 | |
| 5 | 10 | 10 | 10 | 10 | 10 | 10 | 10 | 10 | 10 | 10 | |
↓ Y ADDRESS
FIG. 7B
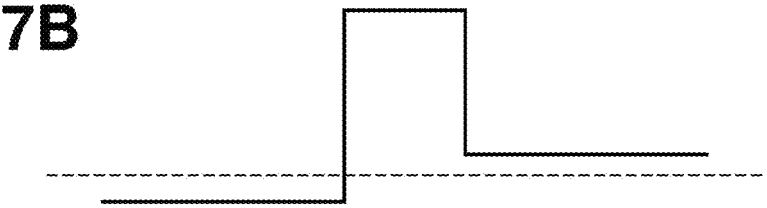

FIG. 8A
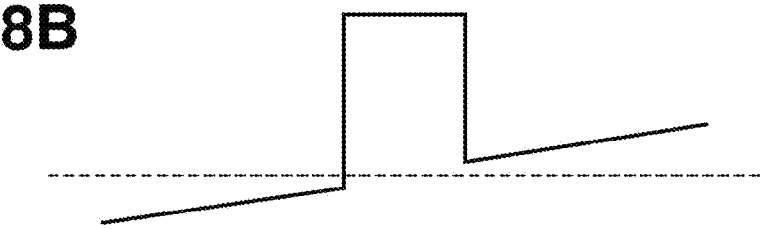
FIG. 8B
FIG. 9A
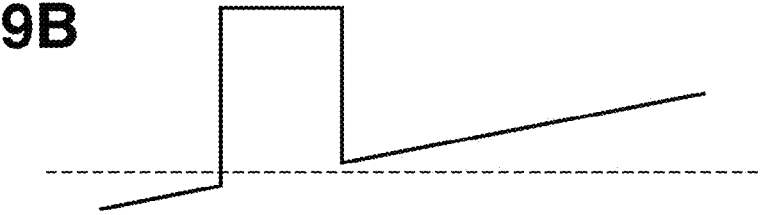
FIG. 9B

FIG. 10A
|   | 0 | 1 | 2 | 3 | 4 | 5 | 6 | 7 | 8 | 9 | → X ADDRESS |
|---|---|---|---|---|---|---|---|---|---|---|---|
| 0 | 10 | 10 | 10 | 10 | 10 | 10 | 10 | 10 | 10 | 10 | |
| 1 | 10 | 10 | 10 | 10 | 10 | 10 | 10 | 10 | 10 | 10 | |
| 2 | 15 | 14 | 13 | 12 | 11 | 99 | 99 | 9 | 8 | 7 | |
| 3 | 15 | 14 | 13 | 12 | 11 | 99 | 99 | 9 | 8 | 7 | |
| 4 | 15 | 14 | 13 | 12 | 11 | 99 | 99 | 9 | 8 | 7 | |
| 5 | 10 | 10 | 10 | 10 | 10 | 10 | 10 | 10 | 10 | 10 | |
↓ Y ADDRESS
FIG. 10B
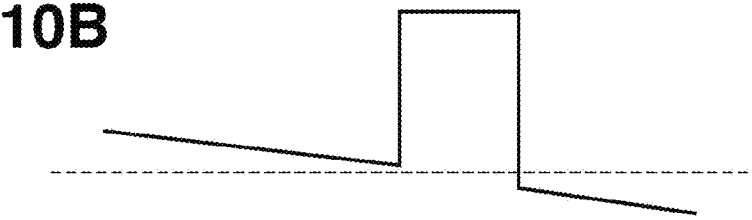
FIG. 11A
|   | 0 | 1 | 2 | 3 | 4 | 5 | 6 | 7 | 8 | 9 | → X ADDRESS |
|---|---|---|---|---|---|---|---|---|---|---|---|
| 0 | 10 | 10 | 10 | 10 | 10 | 10 | 10 | 10 | 10 | 10 | |
| 1 | 10 | 10 | 10 | 10 | 10 | 10 | 10 | 10 | 10 | 10 | |
| 2 | 8 | 9 | 99 | 99 | 10 | 99 | 99 | 11 | 12 | 13 | |
| 3 | 8 | 9 | 99 | 99 | 10 | 99 | 99 | 11 | 12 | 13 | |
| 4 | 8 | 9 | 99 | 99 | 11 | 12 | 13 | 14 | 15 | 16 | |
| 5 | 10 | 10 | 10 | 10 | 10 | 10 | 10 | 10 | 10 | 10 | |
↓ Y ADDRESS
FIG. 11B
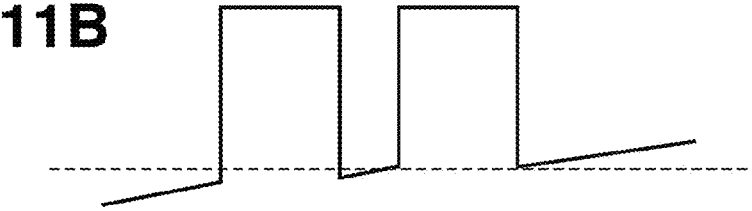

HOB LEVEL
(=REFERENCE SIGNAL
FOR BLACK LEVEL)

FIG. 14A *(PRIOR ART)*
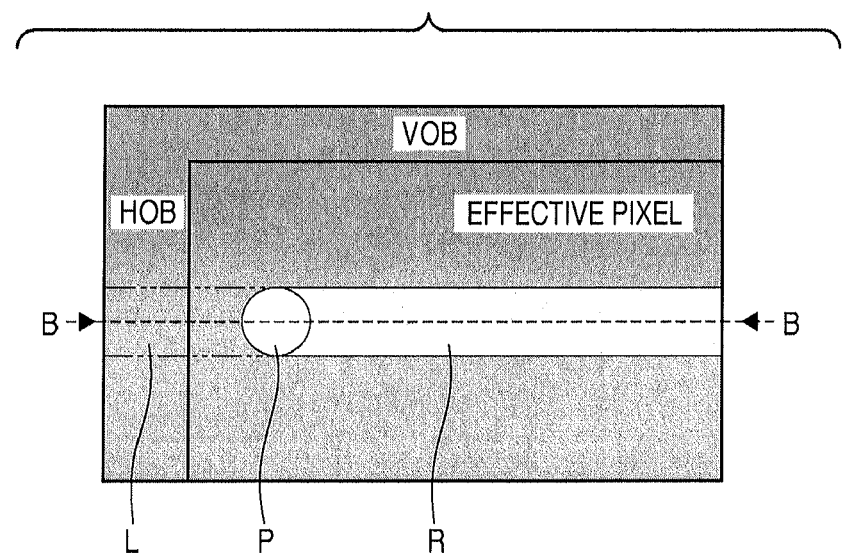
FIG. 14B *(PRIOR ART)*
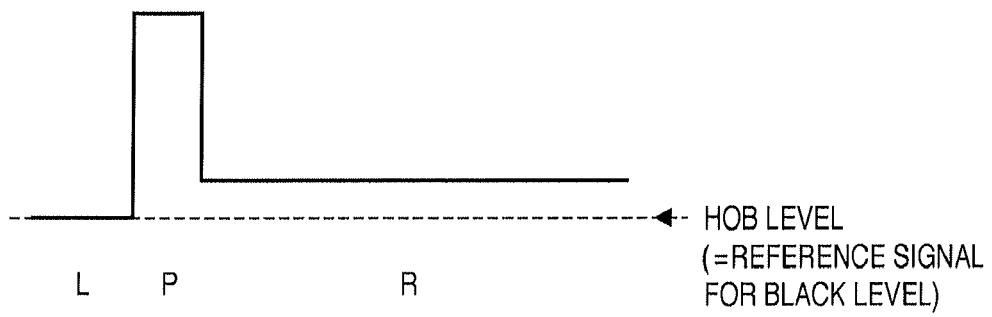

IMAGE CAPTURING APPARATUS WITH CORRECTION USING OPTICAL BLACK AREAS, CONTROL METHOD THEREFOR AND PROGRAM

BACKGROUND OF THE INVENTION

1. Field of the Invention

The present invention relates to a technique for improvement in image quality of an image signal in a solid state image sensor used in a video camera, a digital still camera and the like.

2. Description of the Related Art

In digital cameras, video cameras and the like, a CCD image sensor, a CMOS image sensor or the like is used as a solid state image sensor.

In the meantime, it is known that when a high luminance object exists on a CCD image sensor, a CMOS image sensor or the like, as a signal level of its entire row or column is fluctuated, a vertical or horizontal line image appears. This phenomenon is widely known as a smear phenomenon in the CCD image sensors, and a similar phenomenon also occurs in the CMOS image sensors.

In the CMOS image sensor, this phenomenon occurs due to wiring layout of power source, the ground and the like. Generally, the power source and the ground are wired in a horizontal direction. For example, when a large amount of current flows through a high luminance object in a screen, as a result, the power sources of pixels on the left and right sides of the object are fluctuated, thereby a horizontal line image appears due to the fluctuation of signal level of the entire same line or the subsequent lines. This phenomenon remarkably occurs particularly when an image sensor internal circuit is saturated by a high luminance object, since signal output cannot be sufficiently controlled due to the circuit saturation. Such a problem in the circuit cannot be solved without difficulty.

FIGS. 12A and 12B show the above situation. FIG. 12A show signals from a CMOS image sensor in correspondence with a pixel layout.

Generally, the solid state image sensor has an optical black area shielded from light not to react to light so as to obtain a signal level reference signal (reference signal for black level), and an effective pixel signal is subjected to arithmetic processing on the basis of the level obtained with the optical black area. This pixel is referred to as an "OB pixel (Optical Black pixel)".

In FIG. 12A, areas denoted by "HOB" and "VOB" indicate signals from the above-described optical black pixels. Further, an area denoted by "effective pixel" indicates signals from a pixel area to actually receive light.

FIG. 12A shows a status where high luminance light "P" is received when a peripheral luminance level is low. In the left and right pixel outputs "L" and "R" in the horizontal direction, level fluctuation causes a horizontal line image. As the peripheral luminance is low, ideal output levels of other portions than the portion receiving the high luminance light "P" are the same as those of the HOB and VOB areas.

FIG. 12B shows the image output level on a line A-A in FIG. 12A. The "HOB level" is an average level of areas where the level fluctuation is not caused in the HOB area, and generally this level corresponds to a reference signal for black level. On the other hand, the level of a portion receiving the high luminance light "P" is very high and its output causes circuit saturation. Further, the levels of left and right pixel outputs "L" and "R" are lower than the HOB level and level fluctuation occurs.

FIGS. 13A and 13B show another example where high luminance light exists in the screen. The difference from FIGS. 12A and 12B is that the pixel output "L" on the left side of the high luminance light "P" is lower than the HOB level while the pixel output "R" on the right side of the high luminance light is higher than the HOB level, thus level fluctuation occur. This phenomenon is empirically confirmed. It is considered that the above situation occurs due to the readout order of pixel signals, level fluctuation convergence time and the like, in addition to the wiring layout of the power source and the ground.

For example, in a general CMOS image sensor, signals from 1-line pixels in the horizontal direction are transferred at once to a column readout circuit, then the signals transferred to the column readout circuit are sequentially output from a left pixel in the screen through a final stage common readout circuit. At this time, when the level change occurs not in pixels of the image sensor or the column readout circuit but in the final stage readout circuit, the right side "R" is read immediately after the occurrence of level fluctuation caused by the high luminance light "P", and the left side "L" in the next line is read. It is conceivable that the direction and amount of level fluctuation is changed due to the difference in readout time.

Next, correction of the horizontal line image due to the above-described level fluctuation will be discussed.

Regarding the smear phenomenon in the CCD image sensor or the like, as a similar smear occurs in optical black pixels, Japanese Patent Laid-Open Nos. 07-67038 and 2001-24943 disclose correction on outputs of effective pixels based on an average value of signal values of optical black pixels in the same column.

Especially in Japanese Patent Laid-Open No. 2001-24943, the content of correction processing in smear correcting means is changed in correspondence with the level of an effective image signal. More particularly, when the level of the effective image signal is equal to a predetermined signal saturation level, the smear correction is not performed, thereby the occurrence of darkened image degraded portion due to overcorrection of the saturated portion by the smear correction can be prevented.

In the CMOS image sensor, when level fluctuation occurs on the left and right sides of the high luminance light "P" as shown in FIGS. 12A and 12B, the correction can be performed as disclosed in Japanese Patent Laid-Open Nos. 07-67038 and 2001-24943. However, as shown in FIGS. 13A and 13B, when the left pixel output "L" of the high luminance light "P" is lower than the HOB level while the right pixel output "R" is higher than the HOB level, thus level changes occur, the correction cannot be performed in a similar manner. More particularly, FIGS. 14A and 14B show the result of correction on the outputs of the effective portions based on an average value of HOB pixel signals in the same line. That is, the left pixel output "L" close to the HOB can be corrected, while regarding the right pixel output "R" far from the HOB, as the direction and amount of the level fluctuation are different, it cannot be corrected, and further, the level fluctuation might be increased.

Similarly, in other image sensors such as a CCD image sensor than the CMOS image sensor, when the levels in the left and right or upper and lower sides of the high luminance light "P" are not even but level fluctuation occur, correction cannot be performed.

SUMMARY OF THE INVENTION

The present invention has been made in view of the above-described problems, and enables optimum correction upon reception of high luminance light with an image sensor without horizontal or vertical line even when pixel outputs of the left and right or upper and lower sides of the high luminance light are not even but level fluctuation occurs.

According to a first aspect of the present invention, provided is an image capturing apparatus comprising: an image sensor having an effective pixel area where plural pixels not shielded from light are two-dimensionally arranged, and a first optical black area and a second optical black area including pixels shielded from light, provided on the both sides of the effective pixel area; a correction unit configured to, upon incident of high luminance light on the image sensor, correct an output signal of a pixel between a high luminance portion as a pixel part on which the high luminance light is incident in the effective pixel area and the first optical black area using an output signal of the first optical black area, and correct an output signal of a pixel between the high luminance portion and the second optical black area, using an output signal of the second optical black area.

Further, according to a second aspect of the present invention, provided is a method for controlling an image capturing apparatus which has an image sensor having an effective pixel area where plural pixels not shielded from light are two-dimensionally arranged, and a first optical black area and a second optical black area including pixels shielded from light, provided on the both sides of the effective pixel area, comprising: a correction step of, upon incident of high luminance light on the image sensor, correcting an output signal of a pixel between a high luminance portion as a pixel part on which the high luminance light is incident in the effective pixel area and the first optical black area using an output signal of the first optical black area, and correcting an output signal of a pixel between the high luminance portion and the second optical black area, using an output signal of the second optical black area.

Further features of the present invention will become apparent from the following description of exemplary embodiments with reference to the attached drawings.

BRIEF DESCRIPTION OF THE DRAWINGS

FIGS. 6A and 6B are explanatory views showing ideal pixel outputs;

FIGS. 7A and 7B are explanatory views showing a first horizontal line phenomenon;

FIGS. 8A and 8B are explanatory views showing a second horizontal line phenomenon;

FIGS. 9A and 9B are explanatory views showing a third horizontal line phenomenon;

FIGS. 10A and 10B are explanatory views showing a fourth horizontal line phenomenon;

FIGS. 11A and 11B are explanatory views showing a fifth horizontal line phenomenon;

FIGS. 14A and 14B are explanatory views showing the correction of the horizontal line phenomenon in the conventional art.

DESCRIPTION OF THE EMBODIMENTS

Hereinbelow, embodiments of the present invention will be described in detail with reference to the attached drawings.

First Embodiment

Figure 1:
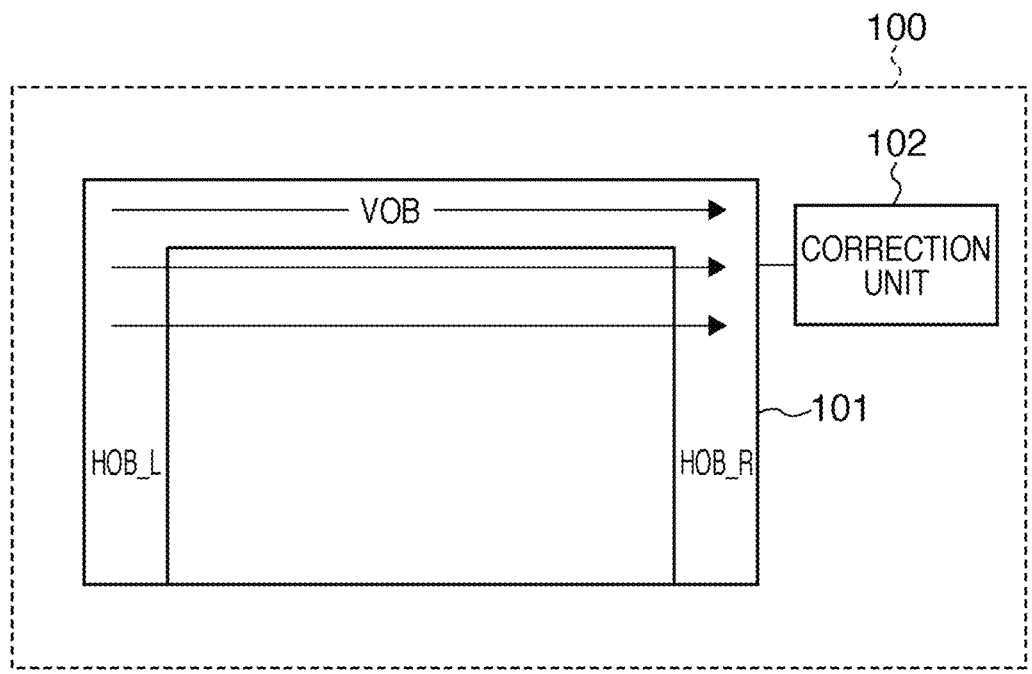
FIG. 1 is a block diagram showing a pixel layout of an entire screen of a CMOS solid state image sensor according to a first embodiment of the present invention.

FIG. 1 shows a pixel layout of an entire screen of a CMOS solid state image sensor 101 used in an image capturing apparatus 100 according to a first embodiment of the present invention. As optical black pixels (OB pixels) shielded from light are arranged as a VOB area on the upper side of an effective pixel area, HOB_L and HOB_R areas on the left and right sides of the effective pixel area. Signals from the pixels are read as indicated with an arrow from an upper left position in FIG. 1. Note that reference numeral 102 denotes a correction unit to correct vertical and horizontal lines which appear on the screen of the image sensor 101.

Figure 2:
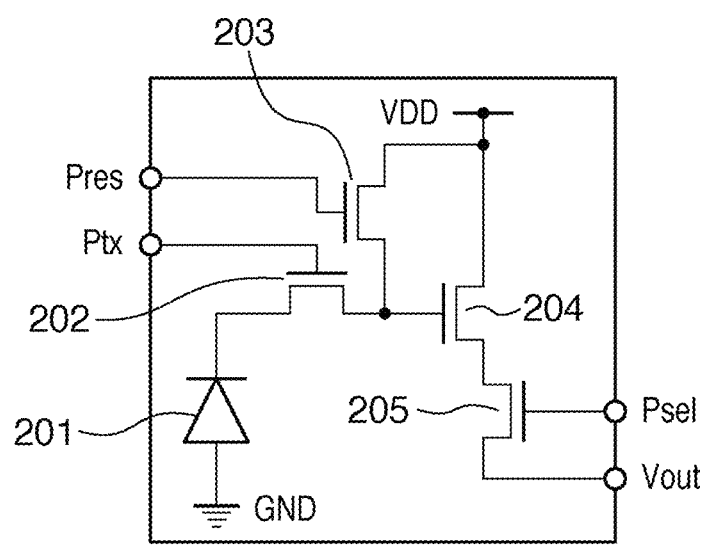
FIG. 2 is a block diagram showing a configuration of a pixel cell two-dimensionally arrayed in the solid state image sensor in the first embodiment of the present invention.

FIG. 2 is a block diagram showing a configuration of a pixel cell Pixel two-dimensionally arrayed in the CMOS solid state image sensor. In a photo diode 201 to generate optical signal charge, the anode side is grounded. The cathode side of the photo diode 201 is connected to the gate of an amplified MOS transistor 204 via a transfer MOS transistor 202. Further, the gate of the above-described amplified MOS transistor 204 is connected to the source of a reset MOS transistor 203 to reset the amplified MOS transistor. The drain of the reset MOS transistor 203 is connected to a power source voltage VDD. Further, in the above-described amplified MOS transistor 204, the drain is connected to the power source voltage VDD, and the source is connected to the drain of the selection MOS transistor 205.

Figure 3:
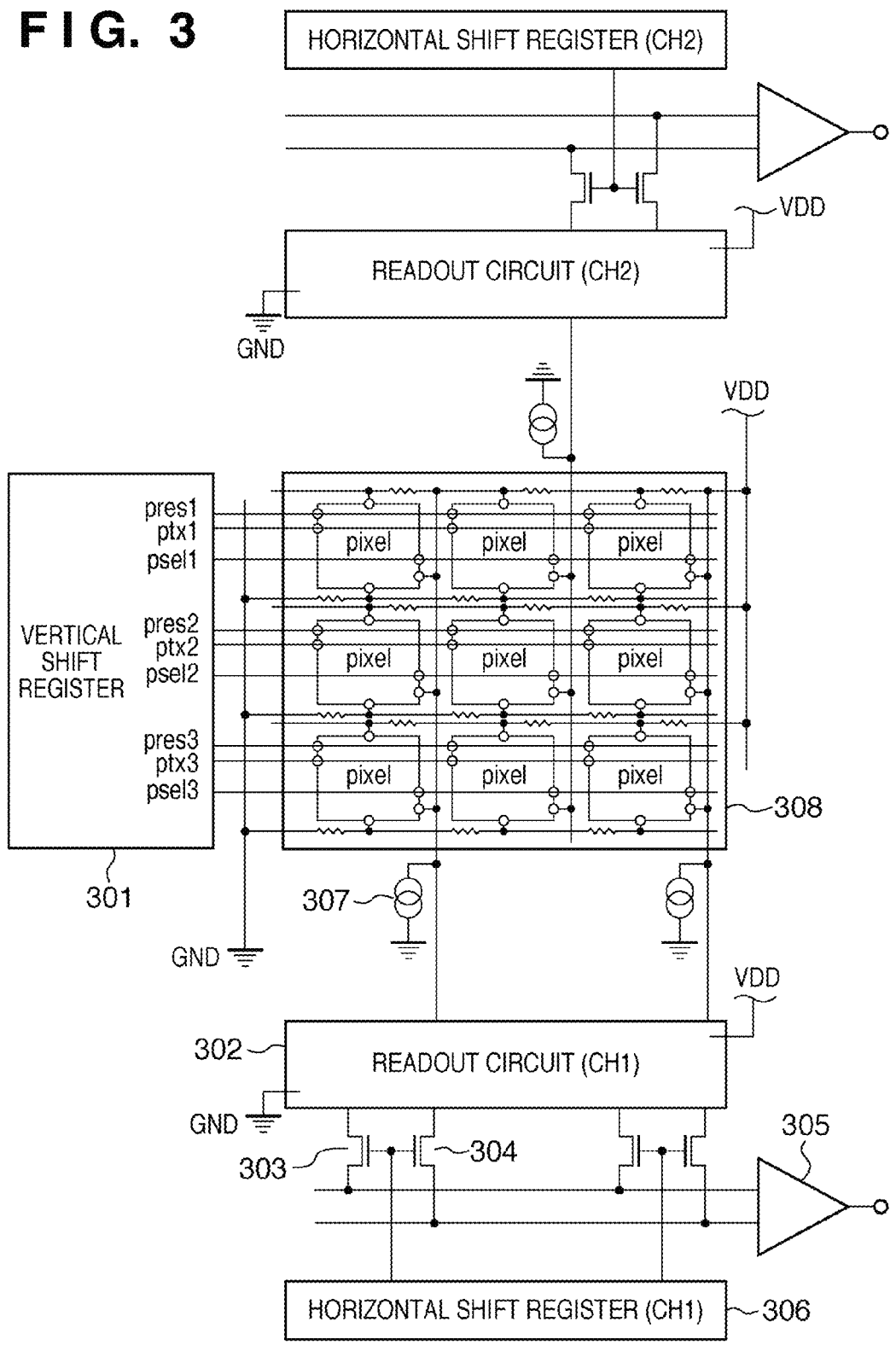
FIG. 3 is a block diagram showing a configuration of the CMOS solid state image sensor in the first embodiment of the present invention.

FIG. 3 is a block diagram showing a configuration of the CMOS solid state image sensor. In the figure, the image sensor has 3×3 pixels for the convenience of explanation, however, generally the image sensor has more pixels. A vertical shift register 301 outputs signals for row selection lines Pres1, Ptx1 and Psel1 to a pixel area 308. The pixel area 308, having the configuration shown in FIG. 1, has plural pixel cells Pixel. Each pixel cell Pixel outputs a pixel signal to respective CH1 and CH2 vertical signal lines in even and odd columns. A current source 307 is connected to the respective vertical signal lines. A readout circuit 302 inputs a pixel signal on the vertical signal line, outputs the pixel signal via an n-channel MOS transistor 303 to a differential amplifier 305, and outputs a noise signal via an n-channel MOS transistor 304 to the differential amplifier 305.

Note that the readout circuit 302 includes a column readout circuit for readout by column, and the differential amplifier 305 corresponds to a final stage readout circuit.

A horizontal shift register 306 ON/OFF controls the transistors 303 and 304. The differential amplifier 305 outputs a difference between a pixel signal and a noise signal.

The gate of the transfer MOS transistor 202 in FIG. 2 is connected to a first row selection line (vertical scanning line) Ptx1 (FIG. 3) extended in the horizontal direction. The gate of the similar transfer MOS transistor 202 of another pixel cell Pixel arranged in the same row is also connected to the above-described first row selection line Ptx1. The gate of the above-described reset MOS transistor 203 is connected to a second row selection line (vertical scanning line) Pres1 (FIG. 3) extended in the horizontal direction. The gate of the similar reset MOS transistor 203 of another pixel cell Pixel arranged in the same row is also connected to the above-described second row selection line Pres1. The gate of the above-described selection MOS transistor 205 is connected to a third row selection line (vertical scanning line) Psel1 extended in the horizontal direction. The gate of the similar selection MOS transistor 205 of another pixel cell Pixel arranged in the same row is also connected to the above-described third row selection line Psel1. These first to third row selection lines Ptx1, Pres1 and Psel1 are connected to the vertical shift register 301, and receive the signal voltage.

In the remaining rows shown in FIG. 3, the pixel cells Pixel having the same configuration and the row selection lines are provided. As these row selection lines, row selection lines Ptx2 to Ptx3, Pres2 to Pres3 and Psel2 to Psel3 formed with the above-described vertical shift register 301 are supplied.

The source of the selection MOS transistor 205 in FIG. 2 is connected to a terminal Vout of a vertical signal line extended in the vertical direction. The source of the similar selection MOS transistor 205 of another pixel cell Pixel arranged in the same column is also connected to the terminal Vout of the above-described vertical signal line. In FIG. 3, the terminal Vout of the above-described vertical signal line is connected to a constant current source 307 as a load means.

Further, in FIG. 3, the VDD power source is supplied to each pixel cell Pixel from the right side of the screen, and the GND (ground) is supplied to each pixel cell Pixel from the left side of the screen, and each equivalent wired resistor is shown between the respective pixel cells Pixel.

Further, the readout circuit 302 inputs the VDD power source from the right side of the screen and the GND (ground) from the left side of the screen, and supplies the inputs to the column readout circuit.

Figure 4A:
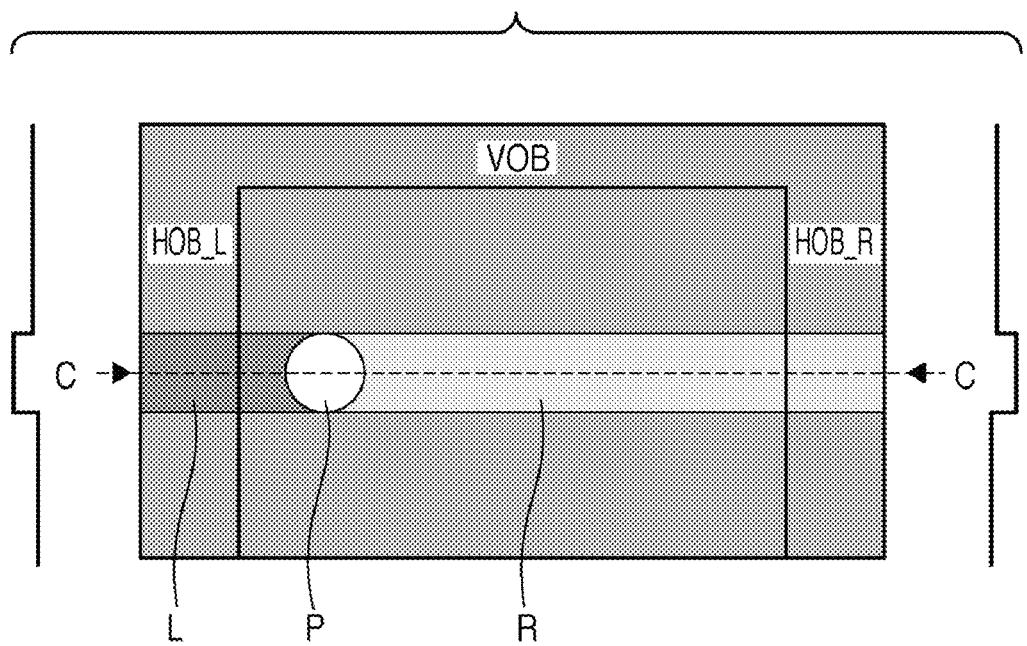
FIGS. 4A and 4B are explanatory views showing a horizontal line phenomenon.
Figure 4B:
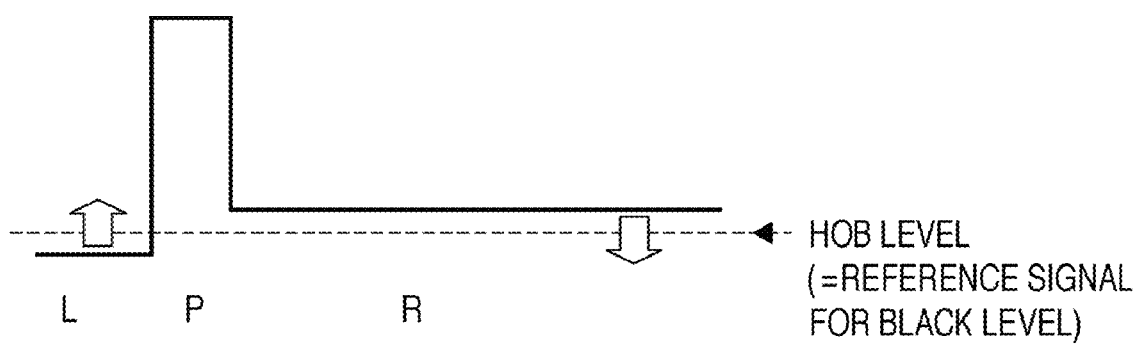

FIGS. 4A and 4B show an example where high luminance light "P" is incident on the image sensor where the optical black pixels are arranged in an HOB_L area (first optical black area) on the left side of the effective pixel area in the screen and in an HOB_R area (second optical black area) on the right side of the effective pixel area in the screen, as in the case of FIG. 1.

In this example, as in the case of FIGS. 14A and 14B, the left pixel output "L" of the high luminance light "P" is lower than the HOB level, while the right pixel output "R" is higher than the HOB level; thus, level fluctuation occurs.

FIG. 4B shows an image output level on a line C-C in FIG. 4A. The HOB level is an average level of areas where no level fluctuation occurs in the HOB area, and generally this level corresponds to a reference signal for black level. For example, in the HOB area, an area with greater level fluctuation in comparison with other areas is excluded and an average level of the remaining areas is obtained.

Figure 5A:
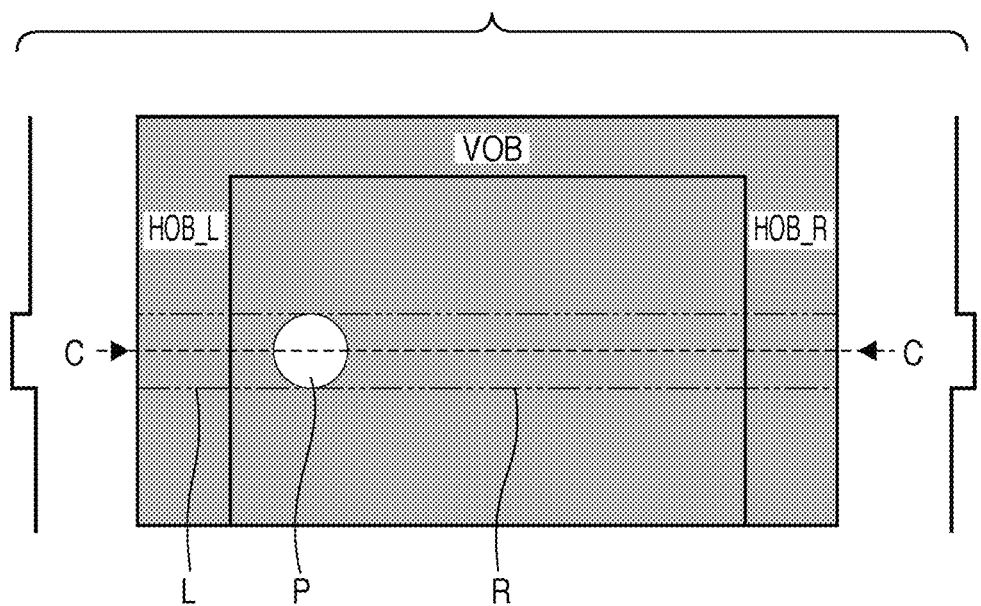
FIGS. 5A and 5B are explanatory views showing correction of the horizontal line phenomenon.
Figure 5B:
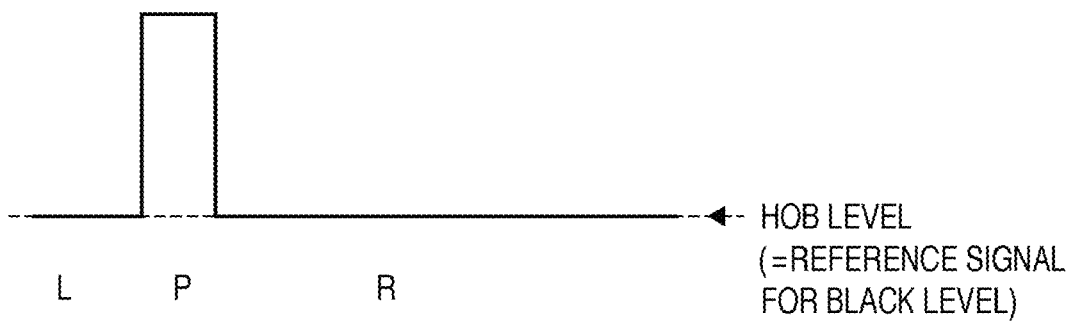
Figure 12A:
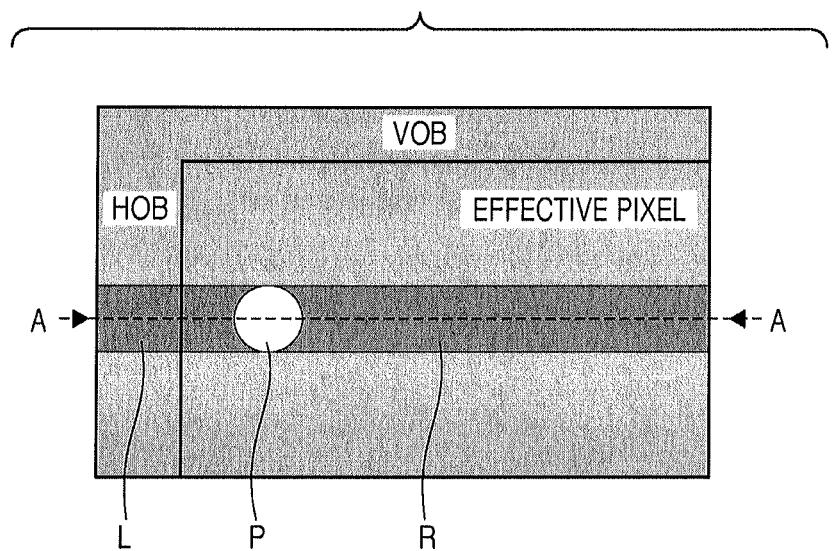
FIGS. 12A and 12B are explanatory views showing the horizontal line phenomenon in the conventional art.
Figure 12B:
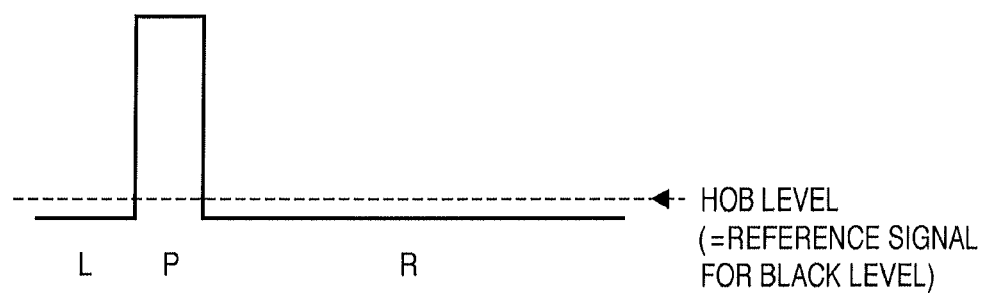
Figure 13A:
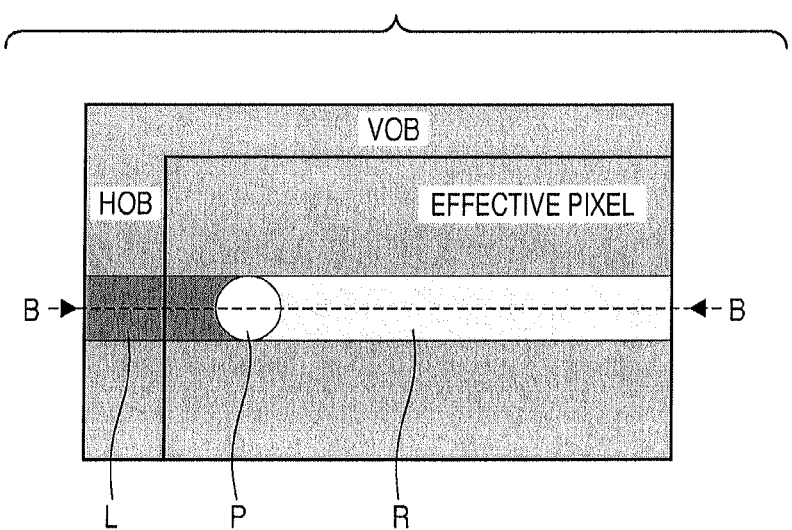
FIGS. 13A and 13B are explanatory views showing the other example of the horizontal line phenomenon in the conventional art.
Figure 13B:
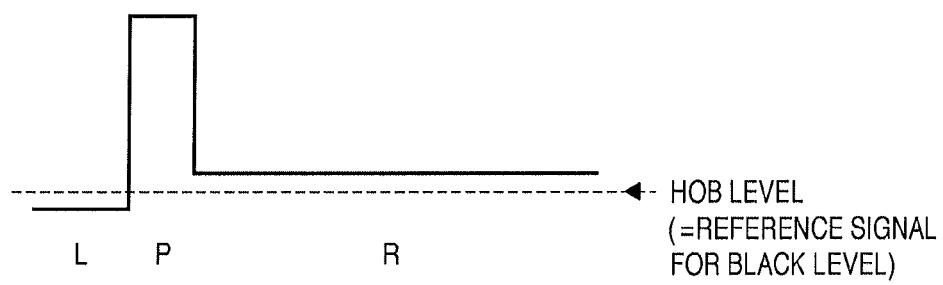

Note that in the effective pixel area, when output correction is performed on an effective portion on the left side of the position where the high luminance light "P" is incident based on a mean value of the HOB_L pixel signals in the same row and on an effective portion on the right side of the position where the high luminance light "P" is incident based on a mean value of the HOB-R pixel signals in the same row, the horizontal line image is sufficiently corrected as shown in FIGS. 5A and 5B. That is, in the effective portion (correction subject pixels) on the left side of the incident position of the high luminance light "P", as the HOB_L level is low, correction is made so as to increase the output signal, while in the effective portion (correction subject pixels) on the right side of the incident position of the high luminance light "P", as the HOB_R level is high, correction is made so as to reduce the output signal.

The image correction on the horizontal line image which appears upon incident of the high luminance light "P" on the image sensor where the optical black pixels are arranged in the HOB_L area in the left part of the screen and in the HOB_R area in the right part of the screen, as shown in FIGS. 4A and 4B, and FIGS. 5A and 5B, will be more particularly described.

FIGS. 6A and 6B show image sensor outputs equivalent to those in FIGS. 4A and 4B. In FIG. 6A, for more particular explanation, the image sensor has 10 pixels 0 to 9 in the horizontal direction (X) and 6 pixels 0 to 5 in the vertical direction (Y), that is, 10×6 pixels. FIG. 6A shows pixel outputs at respective addresses. Hereinbelow, the address of each pixel is indicated as "(X,Y)". Further, in the image sensor, the high luminance light is incident on a central part (4,2) to (5,4) while peripheral luminance is low, and the pixel output value in the high luminance portion is "99" while the output value of other pixels than the high luminance portion and the optical black pixels is "10". Further, X=0 pixel corresponds to the HOB_L area while X=9 pixel corresponds to the HOB_R area.

FIG. 6A shows ideal image sensor outputs without output level fluctuation despite of reception of the high luminance light. FIG. 6B shows Y=3 image output level where a broken line indicates an average level of areas with no level fluctuation in the HOB_L or HOB_R area and other portions than the high luminance portion corresponds to the broken line.

FIGS. 7A and 7B also show image sensor outputs as in the case of FIGS. 6A and 6B. However, FIGS. 7A and 7B show unideal image sensor outputs where the pixel output on the left side of the high luminance light is lower than the HOB level (reference signal for black level) while the pixel output on the right side is higher than the HOB level (reference signal for black level) thus level fluctuation occur as in the case of FIGS. 4A and 4B.

More particularly, in the rows Y=2 to 4, the outputs of the pixels X=0 to 3 on the left side of the high luminance light are uniformly "8" while the outputs of the pixels X=6 to 9 on the right side of the high luminance light are uniformly "12". Further, the HOB level (reference signal for black level) is "10".

Note that assuming that a pixel having a pixel output value "90" is defined as a high luminance object, and when it is determined whether or not a high luminance portion exists in the screen, it is determined that a high luminance object exists in the Y=2 to 4 rows. Then Y=2 to 4 rows are determined as correction object rows.

Then regarding the Y=2 to 4 rows,
   as the difference between the HOB_L and the HOB level (reference signal for black level), 10−8=2 holds, and
   as the difference between the HOB_R and the HOB level (reference signal for black level), 10−12=−2 holds,
accordingly, the pixel outputs on the left and right sides of the high luminance light are respectively corrected as follows.
   By setting such that
   the outputs of the pixels X=0 to 3 on the left side of the high luminance light are +2 and
   the outputs of the pixels X=6 to 9 on the right side of the high luminance light are −2,
the image shown in FIGS. 7A and 7B can be corrected to an image similar to that shown in FIGS. 6A and 6B.

In this manner, according to the present embodiment, the correction on the pixel outputs is performed by selectively using the output values in the HOB_L area and the HOB_R area in correspondence with position (left or right) with respect to the high luminance light. With this arrangement, even when non-uniform level fluctuation occurs on the both sides of the high luminance light, appropriate correction can be performed.

Second Embodiment

In the example shown in FIGS. 7A and 7B, the pixel outputs of the pixels on the left side of the high luminance light are respectively uniformly level fluctuated. In FIGS. 8A and 8B, the amount of level fluctuation of the pixels on the left side of the high luminance light changes in correspondence with position (distance) from the high luminance portion.

More particularly, in the Y=2 to 4 rows, in the outputs of the pixels X=0 to 3 on the left side of the high luminance light, the level is fluctuated by "−1" in accordance with distance from the high luminance light by 1 pixel, while in the outputs of the pixels X=6 to 9 on the right side of the high luminance light, the level is fluctuated by "+1" in accordance with distance from the high luminance light by 1 pixel. That is, the level fluctuation is smaller in a pixel closer to the high luminance portion while the level change is greater in a pixel away from the high luminance portion.

It is understood that the characteristic of the change of the level fluctuation amount in correspondence with position (distance) from a high luminance portion comes from the configuration of the image sensor.

Such level fluctuation is corrected by using the HOB_L and HOB_R signals. A row in which a high luminance object exists as described in the example shown in FIGS. 7A and 7B is determined as a correction object row.

Note that in this example, almost no level fluctuation occurs on the left and right sides of the high luminance portion. Then, as the difference between the HOB_L and the HOB level (reference signal for black level), 10−6=4 holds,
the distance from the HOB_L to the high luminance portion is 4 pixels,
as the difference between the HOB_R and the HOB level (reference signal for black level), 10−14=−4 holds, and
the distance from the HOB_R to the high luminance portion is 4 pixels, accordingly, the pixel outputs on the left and right sides of the high luminance light are respectively corrected as follows.

By setting such that
as the correction amount for the pixels X=0 to 3 on the left side of the high luminance light,
"4" for the pixel X=0, "3" for the pixel X=1, "2" for the pixel X=2, and "1" for the pixel X=3,
and as the correction amount for the pixels X=6 to 9 on the right side of the high luminance light,
"−1" for the pixel X=6, "−2" for the pixel X=7, "−3" for the pixel X=8, and "−4" for the pixel X=9, the image shown in FIGS. 8A and 8B can be corrected to an image similar to that show in FIGS. 6A and 6B.

That is, the correction may be performed by using a value obtained by multiplying the difference between the HOB_L and the HOB level (reference signal for black level) or the HOB_R and the HOB level (reference signal for black level) by a predetermined inclination coefficient in correspondence with position (distance) from the high luminance light.

When this correction is performed in an image capturing apparatus such as a camera, it is effectively performed by previously obtaining the tendency of level fluctuation (pixel outputs between the high luminance portion and the HOB_L and pixel outputs between the high luminance portion and the HOB_R) upon reception of high luminance light as data (information) together with the coordinates of the image sensor then storing the data as a function expression using HOB_L and HOB_R, and performing the correction (calculating a correction value) from the actual high luminance light, the distance from the high luminance light and the output levels of the HOB_L and HOB_R areas.

In this manner, in the present embodiment, the correction on the pixel outputs is performed by selectively using the output values of the HOB_L area and the HOB_R area in correspondence with position (left or right) with respect to the high luminance light. With this arrangement, even when non-uniform level fluctuation occur on the both sides of the high luminance light, appropriate correction can be performed.

Applications of Second Embodiment

FIGS. 9A to 11B show applications of the second embodiments.

FIGS. 9A and 9B show an example where in the image sensor having the characteristic shown in FIGS. 8A and 8B, the incident coordinates of the high luminance light is shifted in the X direction. The correction is performed as described in FIGS. 8A and 8B.

FIGS. 10A and 10B show an example of the image sensor having a characteristic in which the direction of level fluctuation is inverse in comparison with the image sensor having the characteristic shown in FIGS. 8A and 8B. However, the correction as described in FIGS. 8A and 8B can be performed.

FIGS. 11A and 11B show an example where the high luminance light is incident on two positions in the image sensor having the characteristic shown in FIGS. 8A and 8B. In the characteristic shown in FIGS. 8A and 8B, as the left side of the high luminance light shows minus level fluctuation while the right side of the high luminance light, plus level fluctuation, in the high luminance portions and the part between the high luminance portions (X=4), the level fluctuations counteract each other and in the resulted image, such image degraded parts are almost invisible. Accordingly, the correction may be performed as described in FIGS. 8A and 8B, with the pixels X=0 to 1 as the pixels on the left side of the high luminance light while the pixels X=7 to 9 as the pixels on the right side of the high luminance light.

Note that in the second embodiment, the tendency of level fluctuation is previously obtained together with the coordinates of the image sensor as data and stored as a function expression. However, it is conceivable that when there is a difference between the environment (ambient temperature or the like) upon data acquisition and that upon actual image sensing with the image sensor, the effect of correction cannot be sufficiently obtained, since the resistors and the like inside the image sensor which cause level fluctuation are changed in accordance with ambient temperature or the like.

In this case, the correction may be performed using a value obtained by multiplying a correction value obtained by the function expression by a weighted coefficient.

Further, when it is apparent that the level fluctuation characteristic is changed in accordance with coordinates (position) of reception of high luminance light, the weighted coefficient may be changed in accordance with coordinates (position) of reception of high luminance light.

Further, the correction shown in the above-described embodiments may be performed using an application on a personal computer.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-022960, filed Feb. 3, 2009 which is hereby incorporated by reference herein in its entirety.

What is claimed is:

1. An image capturing apparatus comprising:
an image sensor having an effective pixel area where plural pixels not shielded from light are two-dimensionally arranged, and a first optical black area and a second optical black area including pixels shielded from light, provided on the both sides of the effective pixel area;
a correction unit configured to, upon incident of high luminance light on said image sensor, determine a position of a high luminance portion as a pixel part on which said high luminance light is incident in said effective pixel area and correct an output signal of a pixel between said high luminance portion and said first optical black area using an output signal of said first optical black area, and correct an output signal of a pixel between said high luminance portion and said second optical black area, using an output signal of said second optical black area, in accordance with the position of said high luminance portion.

2. The image capturing apparatus according to claim 1, wherein said correction unit uses a value obtained by multiplying the output signal of said first optical black area or the output signal of said second optical black area by a predetermined coefficient in correspondence with a distance between a position of said high luminance portion and a correction subject pixel as a subject of correction, as a correction amount.

3. The image capturing apparatus according to claim 1, wherein the output signal of the pixel between said high luminance portion and said first optical black area and the output signal of the pixel between said high luminance portion and said second optical black area upon incident of the high luminance light on said effective pixel area are previously stored, and wherein said correction unit calculates a correction amount based on the stored information.

4. The image capturing apparatus according to claim 3, wherein said correction unit uses a value obtained by multiplying said stored information by a predetermined coefficient as the correction amount.

5. A method for controlling an image capturing apparatus which has an image sensor having an effective pixel area where plural pixels not shielded from light are two-dimensionally arranged, and a first optical black area and a second optical black area including pixels shielded from light, provided on the both sides of the effective pixel area, comprising:
a correction step of, upon incident of high luminance light on said image sensor, determining a position of a high luminance portion as a pixel part on which said high luminance light is incident in said effective pixel area and correcting an output signal of a pixel between said high luminance portion and said first optical black area using an output signal of said first optical black area, and correcting an output signal of a pixel between said high luminance portion and said second optical black area, using an output signal of said second optical black area, in accordance with the position of said high luminance portion.

* * * * *